(No Model.)
F. SUTER.
PROCESS OF PRODUCING OPEN WORK FABRICS.
No. 280,094. Patented June 26, 1883.
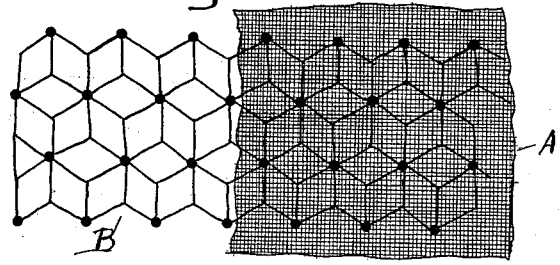
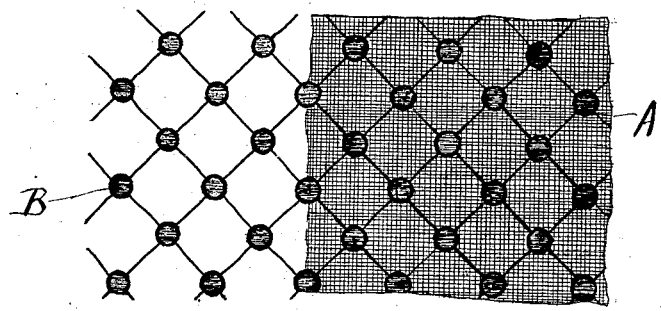
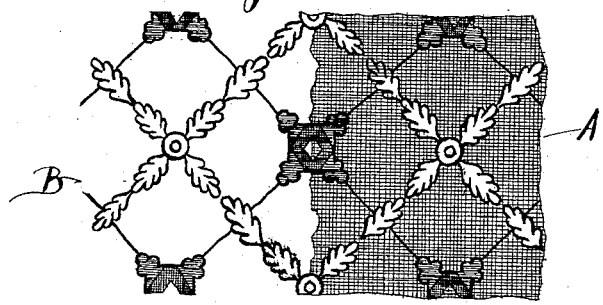
Witnesses.
George Tilghman
Wm H Bates
Inventor.
Frederick Suter
by Wm H Babcock
Attorney.

UNITED STATES PATENT OFFICE.

FREDERICK SUTER, OF SUHR, ASSIGNOR TO THE WETTER BROTHERS, OF ST. GALL, SWITZERLAND.

PROCESS OF PRODUCING OPEN-WORK FABRICS.

SPECIFICATION forming part of Letters Patent No. 280,094, dated June 26, 1883.

Application filed November 29, 1882. (No model.)

*To all whom it may concern:*

Be it known that I, FREDERICK SUTER, of Suhr, in the Canton of Aargau, in the Republic of Switzerland, have invented certain new and useful Improvements in the Manufacture of Fabrics; and I do hereby declare that the following is a full and clear description of the invention, which will enable others to make and use the same.

The object of this invention is to produce an open-work fabric of vegetable fiber by a new, cheap, and easy process. This is effected in the manner hereinafter described and claimed.

In the accompanying drawings, Figures 1, 2, and 3 show in each instance a fabric partly manufactured in accordance with said invention, the ground of animal fiber being indicated by the letter A, and the vegetable fiber embroidered thereon being indicated by B. The animal fiber does not appear in the left portion of any figure, it being supposed to have been removed therefrom, as hereinafter stated.

In carrying out my invention I first embroider any suitable continuous design in cotton on a ground of silk. I then immerse this embroidered silk in a solution of chloride of lime till the silk is dissolved. The embroidery remains uninjured, as chloride of lime will not attack vegetable fiber, and said embroidery then constitutes by itself a highly-ornamental open-work fabric.

Any other vegetable fiber may be substituted for cotton, any other animal fiber for silk, and any other chemical for chloride of lime, provided it be capable of acting on animal fiber, but not on vegetable fiber. The threads may be subsequently bound around or ornamented in any convenient manner.

What I claim is—

The process of manufacturing open-work fabrics, consisting in first embroidering vegetable fiber on a ground of animal fiber, and then dissolving the latter in a solution of chloride of lime, as set forth.

FREDERICK SUTER.

Witnesses:
RAUCH WALTHER,
F. BAUN.